US012686413B2

(12) United States Patent
Refaat et al.

(10) Patent No.: US 12,686,413 B2
(45) Date of Patent: Jul. 21, 2026

(54) INTERVENTION BEHAVIOR PREDICTION WITH CONTINUOUS CONFOUNDERS

(71) Applicant: Waymo LLC, Mountain View, CA (US)

(72) Inventors: Khaled Refaat, Mountain View, CA (US); Nigamaa Nayakanti, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 378 days.

(21) Appl. No.: 18/237,384

(22) Filed: Aug. 23, 2023

(65) Prior Publication Data

US 2025/0065921 A1     Feb. 27, 2025

(51) Int. Cl.
*B60W 60/00*          (2020.01)
(52) U.S. Cl.
CPC .. *B60W 60/00274* (2020.02); *B60W 60/0011* (2020.02)

(58) Field of Classification Search
None
See application file for complete search history.

(56) References Cited

U.S. PATENT DOCUMENTS

| | | | | |
|---|---|---|---|---|
| 2020/0012285 A1* | 1/2020 | Delp | ...................... | G06V 20/58 |
| 2020/0357282 A1* | 11/2020 | Imanishi | ................ | G08G 1/166 |
| 2021/0200230 A1* | 7/2021 | Ross | .................... | G05D 1/0088 |
| 2023/0041975 A1* | 2/2023 | Caldwell | .......... | B60W 60/0027 |

OTHER PUBLICATIONS

U.S. Appl. No. 17/858,886, filed Jul. 6, 2022, Refaat et al.
Hochreiter et al., "Long short-term memory," Neural Computation, Nov. 15, 1997, 9(8):1735-1780.
Refaat et al., "Agent prioritization for autonomous navigation," 2019 IEEE/RSJ International Conference on Intelligent Robots and Systems (IROS), Nov. 3-8, 2019, pp. 2060-2067.
Schwarting et al., "Social behavior for autonomous vehicles," PNAS, Nov. 22, 2019, 116(50);24972-24978.

(Continued)

*Primary Examiner* — James J Lee
*Assistant Examiner* — David Hatch
(74) *Attorney, Agent, or Firm* — Fish & Richardson P.C.

(57)          ABSTRACT

Methods, systems, and apparatus, including computer programs encoded on a computer storage medium, for intervention behavior prediction. A method includes receiving data characterizing a scene that includes a first agent and a second agent and receiving intervention data specifying a planned intervention to be performed by the second agent. A conditional behavior prediction output that assigns, to each of a plurality of possible future behaviors, (i) a respective conditional likelihood that the first agent performs the possible future behavior given that the second agent performs the planned intervention and (ii) a predicted value of a confounder variable for the possible future behavior is generated using a conditional behavior prediction model. An intervention behavior prediction for the first agent is generated by generating a corrected likelihood for each possible future behavior based on the respective conditional likelihood and the predicted value of the confounder variable for the possible future behavior.

20 Claims, 4 Drawing Sheets

(56) References Cited

OTHER PUBLICATIONS

Tang et al., "Interventional Behavior Prediction: Avoiding Overly Confident Anticipation in Interactive Prediction," CoRR, Apr. 19, 2022, arxiv.org/abs/2204.08665v1, 7 pages.

Tang, "Designing Explainable Autonomous Driving System for Trustworthy Interaction," A dissertation submitted in partial satisfaction of the requirements for the degree of Doctor of Philosophy in Engineering—Mechanical Engineering, University of California, Berkeley, School of Engineering Sciences, Spring 2022, 162 pages.

Varadarajan et al., "MultiPath++: Efficient Information Fusion and Trajectory Aggregation for Behavior Prediction," 2022 International Conference on Robotics and Automation (ICRA), May 23-27, 2022, pp. 7814-7821.

Vaswani et al., "Attention is all you need," Advances in neural information processing systems 30, 2017, 11 pages.

* cited by examiner

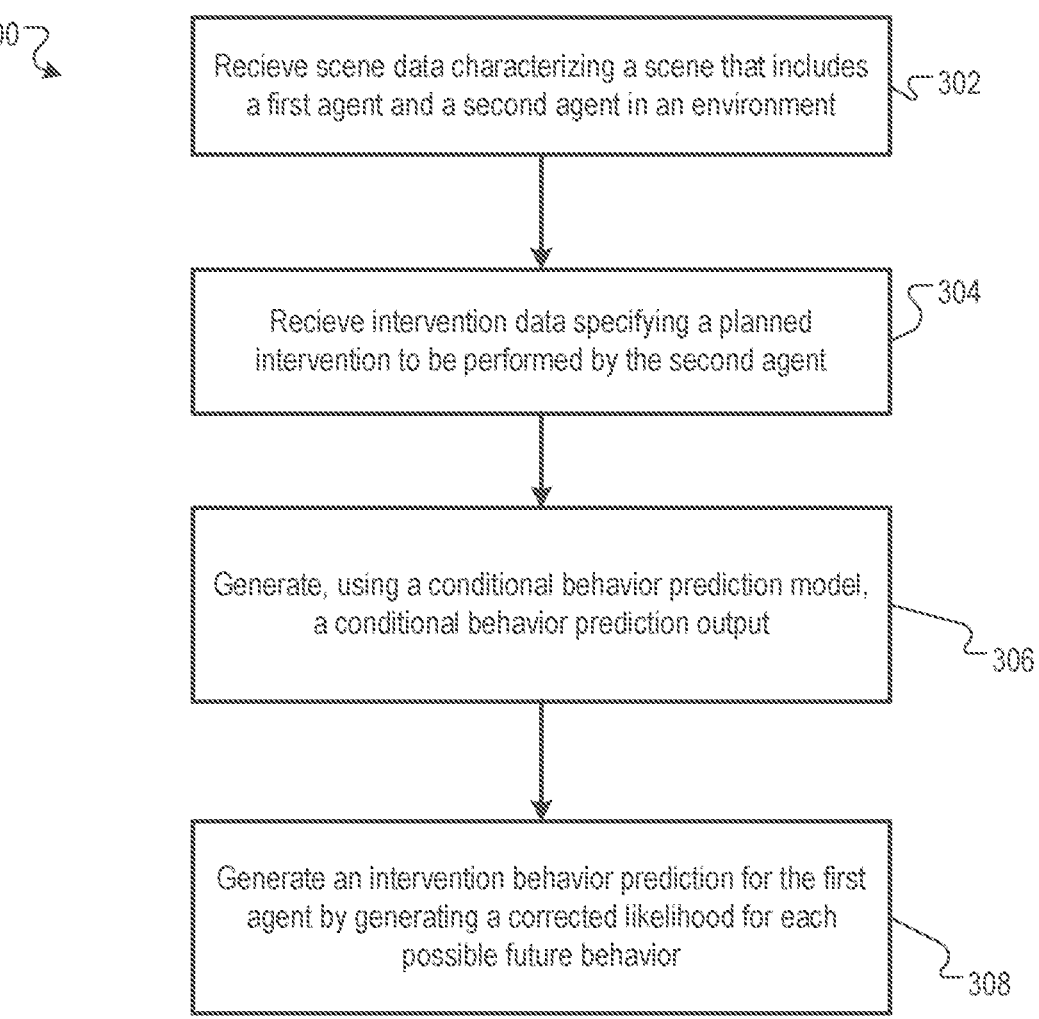

300

Recieve scene data characterizing a scene that includes a first agent and a second agent in an environment — 302

Recieve intervention data specifying a planned intervention to be performed by the second agent — 304

Generate, using a conditional behavior prediction model, a conditional behavior prediction output — 306

Generate an intervention behavior prediction for the first agent by generating a corrected likelihood for each possible future behavior — 308

FIG. 3

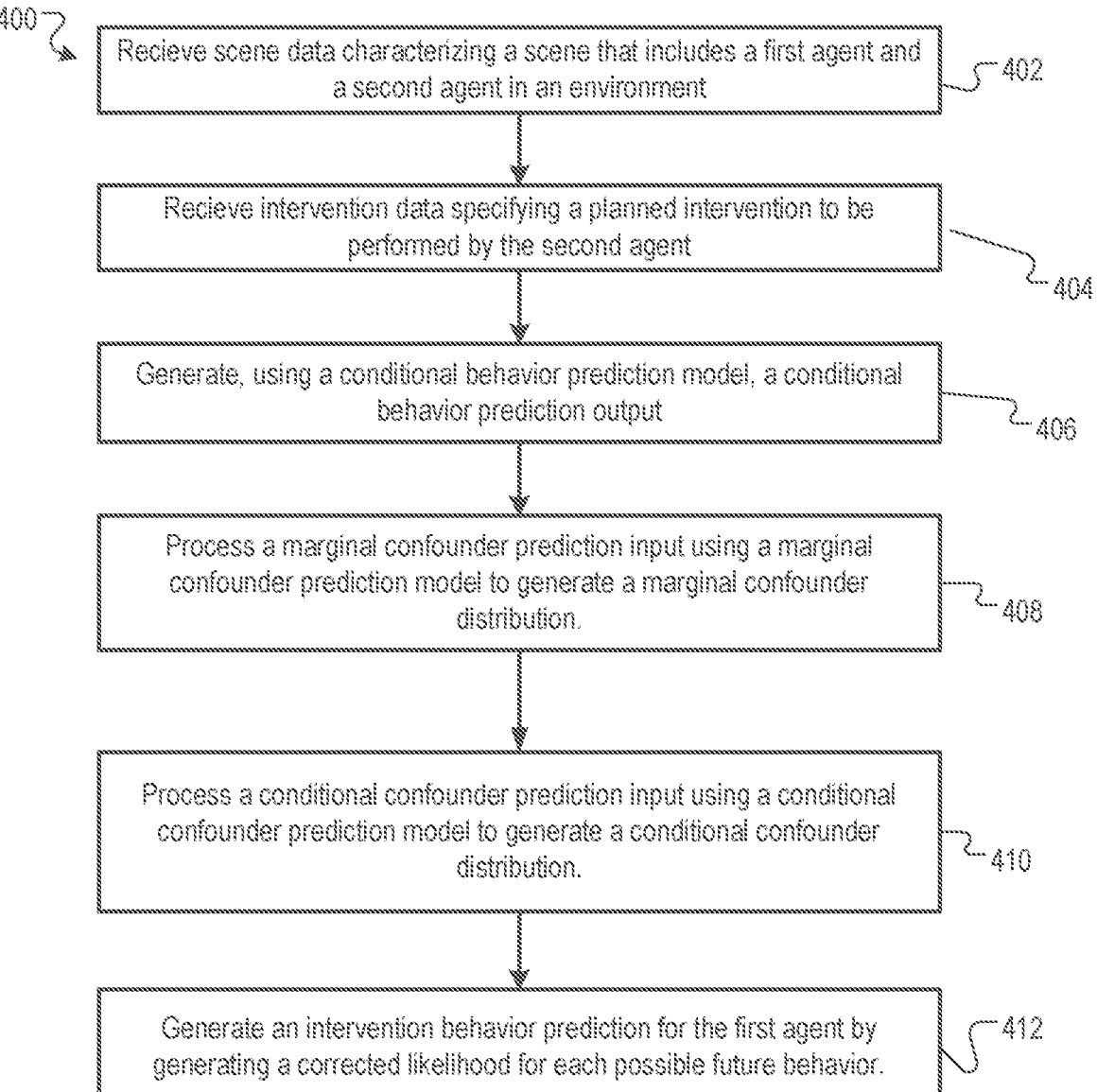

400

Recieve scene data characterizing a scene that includes a first agent and a second agent in an environment
402

Recieve intervention data specifying a planned intervention to be performed by the second agent
404

Generate, using a conditional behavior prediction model, a conditional behavior prediction output
406

Process a marginal confounder prediction input using a marginal confounder prediction model to generate a marginal confounder distribution.
408

Process a conditional confounder prediction input using a conditional confounder prediction model to generate a conditional confounder distribution.
410

Generate an intervention behavior prediction for the first agent by generating a corrected likelihood for each possible future behavior.
412

FIG. 4

INTERVENTION BEHAVIOR PREDICTION WITH CONTINUOUS CONFOUNDERS

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions. Some autonomous vehicles can use a variety of on-board sensors and computer systems to predict nearby objects' behavior and trajectory.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car.

BRIEF DESCRIPTION OF THE DRAWINGS

FIG. 3 is a flow chart of an example process for intervention behavior prediction.

FIG. 4 is a flow chart of an example process for intervention behavior prediction.

Like reference numbers and designations in the various drawings indicate like elements.

DETAILED DESCRIPTION

This specification describes systems and techniques for performing intervention behavior predictions for a nearby object that can interact with an autonomous vehicle. The intervention behavior predictions predict how the nearby object would react if the autonomous vehicle follows a certain planned action or a planned intervention. Thus, the autonomous vehicle can make better control and navigation decisions by taking into consideration the intervention behavior predictions of nearby objects.

Conventionally, autonomous vehicles have computer systems that implement an on-board behavior prediction (BP) model to predict nearby agents' behavior or trajectory. The agents can be other road users, e.g., vehicles, cyclists, pedestrians, and so on. Some autonomous vehicles can have computer systems that implement a conditional behavior prediction (CBP) to predict nearby agents' behavior or trajectory conditioned on a planned action of the autonomous vehicle.

However, the CBP may not accurately reflect an agent's possible behaviors in reaction to the autonomous vehicle performing a planned action. For example, an agent's behavior may have been caused by other factors rather than the autonomous vehicle's planned action and the CBP may not be able to capture the impact of these other factors.

To address these issues, this specification describes an intervention behavior prediction (IBP) technique to predict how nearby agents would react if the autonomous vehicle follows a certain planned action or a planned intervention while taking continuous confounder variables into account.

Rather than calculating the CBP, the IBP technique can generate accurate intervention behavior predictions by taking into account one or more confounder variables that affect an agent's decision making. For example, an agent's reactivity, awareness, intent, or driving style could affect the agent's behavior in response to the autonomous vehicle's planned action. The IBP technique can predict a distribution over the one or more confounder variables, and the IBP technique can combine the prediction over the confounder variables with predictions of the agent's behavior conditioned on the confounder variables and the autonomous vehicle's planned action or planned intervention. Based on the IBP, the planning subsystem of an autonomous vehicle can make safe and efficient control and navigation decisions for the autonomous vehicle.

Moreover, this specification describes generating IBPs that account for confounders that are represented as continuous variables. By extending IBPs to continuous confounder variables, the system can more accurately model the impact of these confounder variables on the future behavior of objects in the environment.

Figure 1:
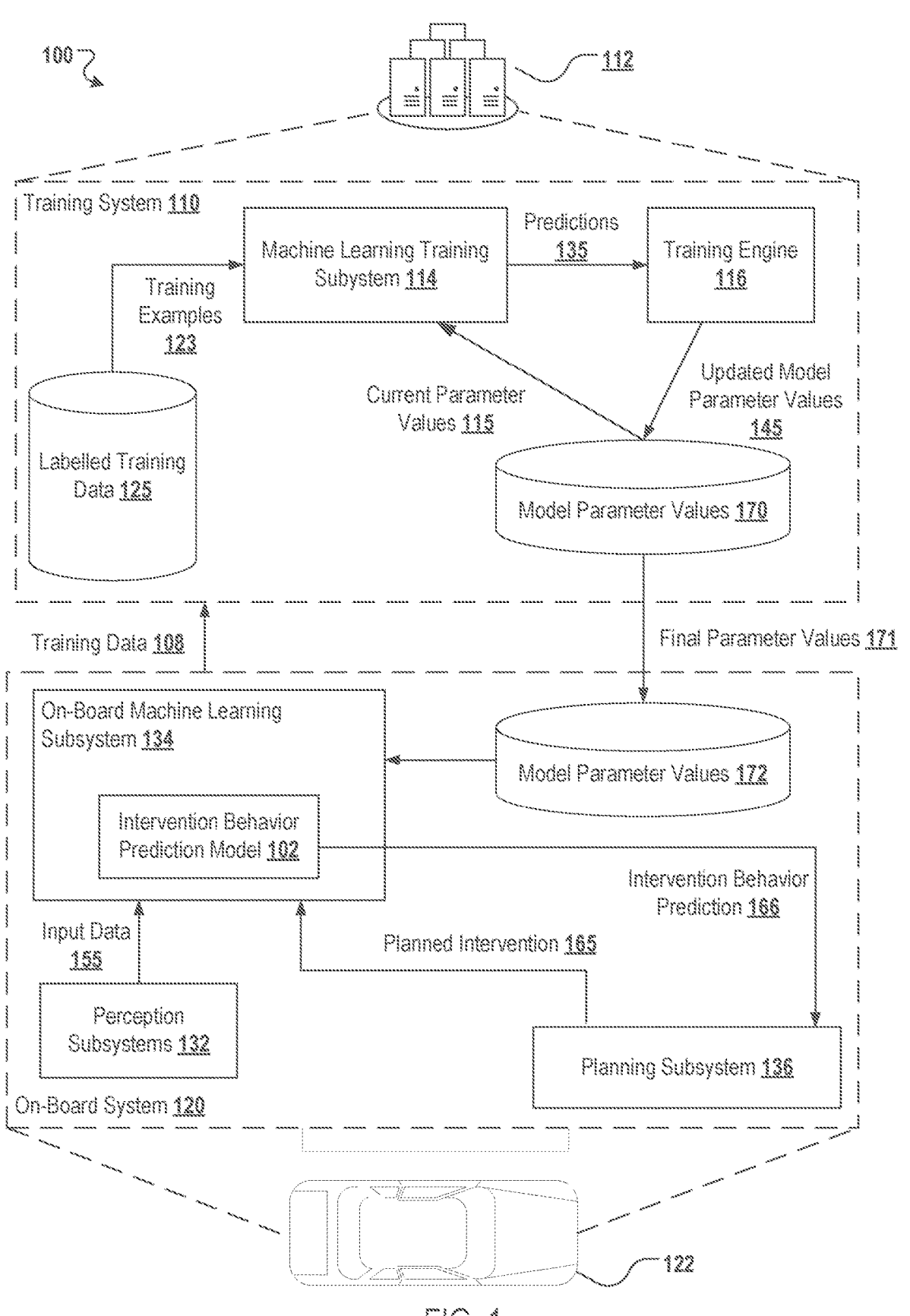
FIG. 1 is a diagram of an example system.

FIG. 1 shows an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. In some cases, the vehicle 122 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 122 can autonomously apply the brakes if a prediction indicates that a human driver is about to collide with another vehicle. As another example, the vehicle 122 can have an advanced driver assistance system (ADAS) that assists a human driver of the vehicle 122 in driving the vehicle 122 by detecting potentially unsafe situations and alerting the human driver or otherwise responding to the unsafe situation. As a particular example, the vehicle 122 can alert the driver of the vehicle 122 or take an autonomous driving action when an obstacle is detected, when the vehicle departs from a driving lane, or when an object is detected in a blind spot of the human driver.

The on-board system 120 includes one or more perception subsystems 132. The perception subsystems 132 can generate input data 155 characterizing a scene that includes one or more agents and the vehicle 122 in an environment. The agents can be other road users, e.g., vehicles, cyclists, pedestrians, and so on that are within the range of one or more of the sensors of the vehicle 122.

The data characterizing the scene can include data characterizing the objects in the scene, e.g., for any given object, one or more of the object type, object attributes (e.g., child, special vehicle, and turn signal), object property (e.g., human activity, sign), object trajectory, object coordinates, object speed, object heading, object curvature, and so on of the given object.

For example, the perception subsystems 132 can include a combination of sensor components that receive reflections of electromagnetic radiation, e.g., lidar systems that detect reflections of laser light, radar systems that detect reflections of radio waves, and camera systems that detect reflections of visible light and can use measurements from those sensors to generate data characterizing the scene.

Additionally, the perception subsystems 132 can obtain predetermined environment information, e.g., information identifying lanes, traffic signs, crosswalks, and other roadway features that can be found in a road graph or map of the environment. In some implementations, the on-board system 120 can obtain navigation history information (e.g., trajectories and speeds, headings, etc.) of the vehicle 122, e.g., from driving logs of the vehicle, and can provide the navigation history information as part of the input data 155.

Using the predetermined environment information and sensor captured information, the perception subsystems 132 can generate the input data 155 characterizing the scene. The input data 155 that can help to predict possible behaviors for the agents in the scene.

For example, the data characterizing the scene that includes an agent in the environment can include an image or a video of the agent over a period of time captured by a camera sensor, point cloud data of the agent captured by a lidar sensor, road information (e.g., lanes and stop signs), locations of surrounding objects (e.g., other vehicles and pedestrians), and so on.

A planning system 136 can generate autonomous driving plans for the vehicle 122 by planning one or more possible future trajectories of the vehicle 122. The planning system 136 can receive perception information generated from sensor data (e.g., locations of one or more agents and their predicted behaviors) and can generate the one or more possible future trajectories based on the perception information. The perception information can be generated by the perception subsystem 132. As one example, the planning system 136 can include a planning model, e.g., a machine learning model, that can be configured to generate the one or more future trajectories.

At any given time point during the operation of the vehicle 122, the planning system 136 can generate candidate interventions as part of the planning of the future trajectory after the given time point. Each candidate intervention can be a planned intervention that the vehicle 122 follows. The planned intervention can include a planned action the vehicle 122 would follow in the future, a trajectory the vehicle 122 would follow in the future, a planned geometry of the vehicle 122, a planned speed of the vehicle 122, or a combination of the above. For example, a planned intervention can include an action of "slowing down" or "turning left". As another example, a planned intervention can include the trajectory of the vehicle 122 over a future period of time, e.g., over 3 seconds, 5 seconds, or 10 seconds.

The planning system 136 can provide the candidate interventions, e.g., a planned intervention 165, to a prediction model, in order to query how other agents in the scene would react if the vehicle 122 follows the candidate interventions. In some implementations, the planning subsystem 136 can send multiple queries requesting a respective intervention behavior prediction for an agent in reaction to multiple possible planned interventions or planned actions to be performed by the vehicle 122. The prediction model can process each query and provide respective intervention behavior predictions 166 in reaction to the vehicle 122 performing each planned intervention.

The perception subsystems 132 provide input data 155 to an on-board machine learning subsystem 134. The on-board machine learning subsystem 134 is a system that deploys one or more trained machine learning models on-board the vehicle 122.

The on-board machine learning subsystem 134 implements operations of an intervention behavior prediction (IBP) model 102. The IBP model 102 can process the input data 155 to generate an intervention behavior prediction for a nearby agent, i.e., how the nearby agent would react if the autonomous vehicle 122 follows a certain planned intervention 165.

A nearby agent or an agent in a "vicinity" of the vehicle 122 in an environment is an agent that is within a range of at least one of the sensors of the vehicle 122, e.g., an agent that can be sensed or measured by one or more of the sensors of the vehicle 122.

A planned intervention 165 of the vehicle 122 can be an action, a trajectory, a geometry, or a speed that the vehicle plans to execute over a future period of time. The planned intervention 165 can be generated by a planning subsystem 136 of the on-board system 120. For example, the planned intervention 165 can include one of the following: driving forward, turning left, turning right, stopping, changing lanes, etc. As another example, the planned intervention 165 can include trajectories of the vehicle 122 doing different maneuvers: driving forward, turning left or right, stopping, changing lanes, and/or generally representing different variations in an autonomous driving path geometry and trajectory speed profile for executing these different maneuvers.

For example, the IBP model 102 can receive input data 155 that characterizes a scene that includes an agent and the vehicle 122 in an environment and the navigation history of the agent and navigation history of the vehicle 122. The IBP model 102 can receive a query requesting a predicted behavior distribution for the agent if the vehicle 122 performs a planned intervention 165, e.g., a yielding action, to the agent. The IBP model 102 can process the input data 155 to generate a predicted probability distribution over a plurality of possible behaviors for the agent in reaction to the vehicle 122 performing the planned intervention 165, e.g., the yielding action. Thus, the vehicle 122 can make better control and navigation decisions by taking into consideration the predicted behavior distribution for the agent given that the vehicle 122 executes the planned intervention 165.

Some autonomous vehicles can have computer systems that implement a conditional behavior prediction (CBP) model to predict nearby agents' behavior or trajectory conditioned on a planned action of the autonomous vehicles. For example, the CBP can be formulated as Pr(Agent prediction|planned action), where Pr represents the probability of the agent prediction given the planned action. Thus, the conditional behavior prediction models the probability that the nearby agent performs a given future behavior if the vehicle 122 performs a given planned action.

However, the CBP may not accurately reflect an agent's possible behaviors in reaction to the autonomous vehicle performing the planned action. In particular, an agent's behavior may have been caused by other factors rather than the autonomous vehicle's planned action. For example, an agent may determine to slow down due to a red traffic light and not due to the autonomous vehicle's lane changing plan. However, a CBP may still indicate that the agent would be more likely to slow down if the autonomous vehicle follows the lane changing plan, because the CBP only captures an association between two events, without questioning the causality relationship between the two events.

Instead of performing a CBP, the IBP model 102 can generate accurate intervention behavior predictions 166 by taking into account confounder variables that affect an agent's decision making.

In general, a confounder variable is a variable whose presence affects the variables being studied so that the results do not reflect the actual relationship between the variables.

In intervention behavior prediction, a confounder variable is a characteristic variable of a nearby agent, a characteristic variable of the environment (e.g., a state of a traffic light), or both, that affects the possible behaviors of the agent and the possible behaviors of the autonomous vehicle. Thus, the confounder variable could impact the agent's reaction to the planned intervention of the vehicle 122, i.e., by impacting how the agent reacts to planned interventions.

Examples of a confounder variable include an agent's reactivity (e.g., levels of reactivity to an intervention), awareness (e.g., levels of awareness to an intervention), or driving style (e.g., means of a judgment expressed by the driver on a scale ranged from aggressive to cautious). In some implementations, examples of a confounder variable can include a predicted future state of the environment that includes the agent and the autonomous vehicle.

A description of some example confounder variables now follows.

The confounder variable can be a reactivity variable. A reactivity variable measures how strongly the agent changes its behavior in response to the behavior of the autonomous vehicle. The reactivity variable can be represented by a value within some predefined range, e.g., on a sliding numbered scale of reactivity scores. The range of reactivity scores can be predetermined by the system 100. At any given time point, the reactivity variable can be at a particular value within the predefined range.

The confounder variable can be an awareness variable. An awareness variable measures how strongly the agent is aware of or is paying attention to the behavior of the autonomous vehicle. The awareness variable can be represented by a value within some predefined range, e.g., on a sliding numbered scale of awareness scores. At any given time point, the awareness variable can be at a particular value within in the predefined range.

The confounder variable can be a driving style variable. A driving style variable measures how aggressively a given driver drives on a scale ranging from aggressive to cautious. The driving style variable can be represented by a value within some predefined range, e.g., on a sliding numbered scale of aggression scores. At any given time point, the driving style variable can be at a particular value within in the predefined range.

Any of the confounder variables described above can be defined as a discrete variable and include multiple possible classes. For example, the driving style variable can include multiple possible classes, e.g., extremely aggressive, aggressive, cautious, and extremely cautious.

The confounder variable can be a single characteristic variable, e.g., reactivity of the agent. Alternatively, the confounder variable can be a multi-dimensional variable that includes two or more characteristics, e.g., reactivity and intent, or awareness and driving style. More specifically, the confounder variable can be a single continuous characteristic variable or a multidimension variable that includes two or more continuous characteristics, or a combination of continuous and discrete characteristic variables.

The IBP model 102 can include a marginal confounder prediction model, a conditional confounder prediction model, and a conditional behavior prediction model to take into account confounder variables that affect an agent's decision making.

Based on the output from the marginal confounder prediction model, the conditional confounder prediction model, and the conditional behavior prediction model, the IBP model 102 can be configured to generate an intervention behavior prediction 166 for a given planned intervention.

The intervention behavior prediction 166 includes a probability distribution over the plurality of the possible behaviors for the agent in reaction to the vehicle 122 performing the planned intervention.

The on-board machine learning subsystem 134 can implement the operations of a machine learning model, such as the operations of the IBP model 102 trained to make intervention behavior predictions 166 for nearby agents or agents in the vicinity of the vehicle 122.

The intervention behavior predictions 166, i.e., the plurality of possible behaviors for the agent, can include possible trajectories of the agent over a future period of time. In some implementations, the plurality of possible behaviors for the agent can include a sequence of heatmaps over a future time period, and the sequence of heat-maps can indicate predicted locations of the agent over the future time period.

For example, the IBP model 102 can predict a probability distribution for another vehicle in the vicinity of the vehicle 122 in reaction to the vehicle 122 performing a planned intervention 165. The probability distribution of possible behaviors for the other vehicle can include: a driving forward trajectory with a probability 0.3, a lane changing trajectory with a probability 0.4, and a stopping trajectory with a probability 0.3. The sum of the probabilities is 1.0. The predicted trajectory can describe the locations and speeds of the agent at a plurality of possible future time points.

Thus, the on-board machine learning subsystem 134 includes one or more computing devices having software or hardware modules that implement the operations of the IBP model 102 according to operations of the machine model included in the IBP model 102, e.g., an architecture of the neural networks included in the IBP model 102.

The on-board machine learning subsystem 134 can implement the operations of each layer of the IBP model 102 by loading a collection of model parameter values 172 that are received from the training system 110. Although illustrated as being logically separated, the model parameter values 170 and the software or hardware modules performing the operations may actually be located on the same computing device or, in the case of an executing software module stored within the same memory device.

In some implementations, the on-board machine learning subsystem 134 can use hardware acceleration or other special-purpose computing devices to implement the operations of one or more layers of the IBP model 102 that includes a neural network model. For example, some operations of some layers may be performed by highly parallelized hardware, e.g., by a graphics processing unit or another kind of specialized computing device. In other words, not all operations of each layer need to be performed by central processing units (CPUs) of the on-board machine learning subsystem 134.

The on-board machine learning subsystem 134 processes the input data 155 to generate intervention behavior predictions 166 of a nearby agent in reaction to the vehicle 122 performing a planned intervention 165. The on-board machine learning subsystem 134 can provide the intervention behavior predictions 166 to a planning subsystem 136, e.g., as a response to a query requesting the intervention behavior prediction.

When the planning subsystem 136 receives the intervention behavior prediction 166, the planning subsystem 136 can use the intervention behavior prediction 166 to make fully autonomous or semi-autonomous driving decisions. The planning subsystem 136 can generate a planned trajectory for the vehicle 122 using the intervention behavior prediction 166 for the nearby agent.

For example, the planning subsystem 136 can generate a fully-autonomous plan to stay in the current lane for a while based on a predicted trajectory of a nearby vehicle indicating that the vehicle is not going to yield to the autonomous vehicle 122 if the autonomous vehicle 122 performs a lane changing action. As another example, the planning subsystem 136 can generate a fully-autonomous plan to stop based on a predicted trajectory of a pedestrian indicating that the pedestrian is going to cross the road in front of the autonomous vehicle 122 if the autonomous vehicle 122 performs a stopping action.

In some implementations, the planning subsystem 136 can receive respective intervention behavior predictions 166 of an agent in reaction to the vehicle performing multiple possible planned interventions. The planning subsystem 136 can generate a planned trajectory for the vehicle 122 by comparing the multiple intervention behavior predictions 166, e.g., to find a safe trajectory to navigate around an agent.

For example, the planning subsystem 136 can receive a first intervention behavior prediction of a cyclist in reaction to a planned yielding action of the vehicle 122. The planning subsystem 136 can receive a second intervention behavior prediction of the cyclist in reaction to a planned passing action of the vehicle 122 that passes the cyclist without yielding. The planning subsystem 136 can compare the predicted behaviors of the cyclist under the two planned interventions. The second intervention behavior prediction can predict a trajectory of the cyclist that indicates the cyclist would go forward with a 60% likelihood if the vehicle 122 does not yield, e.g., maybe because the reactivity of the cyclist is slow. The first intervention behavior prediction can predict a trajectory of the cyclist that indicates the cyclist would go forward with a 70% likelihood if the vehicle 122 does yield. Therefore, the planning subsystem 136 can plan a trajectory for the vehicle to yield to the cyclist.

The on-board machine learning subsystem 134 can also use the input data 155 and the corresponding planned interventions 165 to generate training data 108. The training data 108 can be used to train the IBP model 102. The on-board system 120 can provide the training data 108 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a machine learning training subsystem 114 that can implement the operations of an IBP model 102 that is configured to generate an intervention behavior prediction for an agent in response to the vehicle 122 performing a planned intervention. In some implementations, the machine learning training subsystem 114 can implement the operations of a reactivity prediction model that is included in the IBP model 102 to generate a reactivity distribution for an agent. In some implementations, the machine learning training subsystem 114 can implement the operations of a conditional behavior prediction model that is included in the IBP model 102 to generate a predicted conditional probability distribution of possible behaviors for an agent in reaction to the vehicle 122 performs a planned intervention. The machine learning training subsystem 114 includes a plurality of computing devices having software or hardware modules that implement the respective operations of a machine learning model, e.g., respective operations of each layer of a neural network according to an architecture of the neural network.

The training IBP model generally has the same architecture and parameters as the onboard IBP model 102. However, the training system 110 need not use the same hardware to compute the operations of the IBP model 102. In other words, the training system 110 can use CPUs only, highly parallelized hardware, or some combination of these.

The machine learning training subsystem 114 can compute the operations of the IBP model, e.g., the operations of each layer of a neural network, using current parameter values 115 stored in a collection of model parameter values 170. Although illustrated as being logically separated, the model parameter values 170 and the software or hardware modules performing the operations may actually be located on the same computing device or on the same memory device.

The machine learning training subsystem 114 can receive training examples 123 as input. The training examples 123 can be labeled training data 125 that is stored in a database. Each training example includes an input that characterizes a scene that includes an agent and a vehicle in an environment as well as one or more labels that indicate a ground truth behavior of the agent in response to the vehicle performing a planned intervention.

The machine learning training subsystem 114 can generate, for each training example 123, error predictions 135. Each error prediction 135 represents an estimate of an error between a ground truth label of the agent and the predicted probability distribution (e.g., the predicted reactivity distribution or the predicted conditional reactivity distribution) generated by the IBP model 102 that is being trained. A training engine 116 analyzes the error predictions 135 and compares the error predictions to the labels in the training examples 123 using a loss function, e.g., a classification loss or a regression loss function. The training engine 116 then generates updated model parameter values 145 by using an appropriate updating technique, e.g., stochastic gradient descent with backpropagation. The training engine 116 can then update the collection of model parameter values 170 using the updated model parameter values 145. The training engine 116 computes errors in confounder distributions relative to a ground truth confounder distribution for both the conditional ground truth distribution and the marginal ground truth distribution.

After training is complete, the training system 110 can provide a final set of model parameter values 171 to the on-board system 120 for use in making fully autonomous or semiautonomous driving decisions. For example, the training system 110 can provide a final set of model parameter values 171 to the IBP model 102 that runs in the on-board system 120 to generate intervention behavior predictions 166 for an agent in reaction to the vehicle performing a planned intervention 165. The training system 110 can provide the final set of model parameter values 171 by a wired or wireless connection to the on-board system 120.

Figure 2:
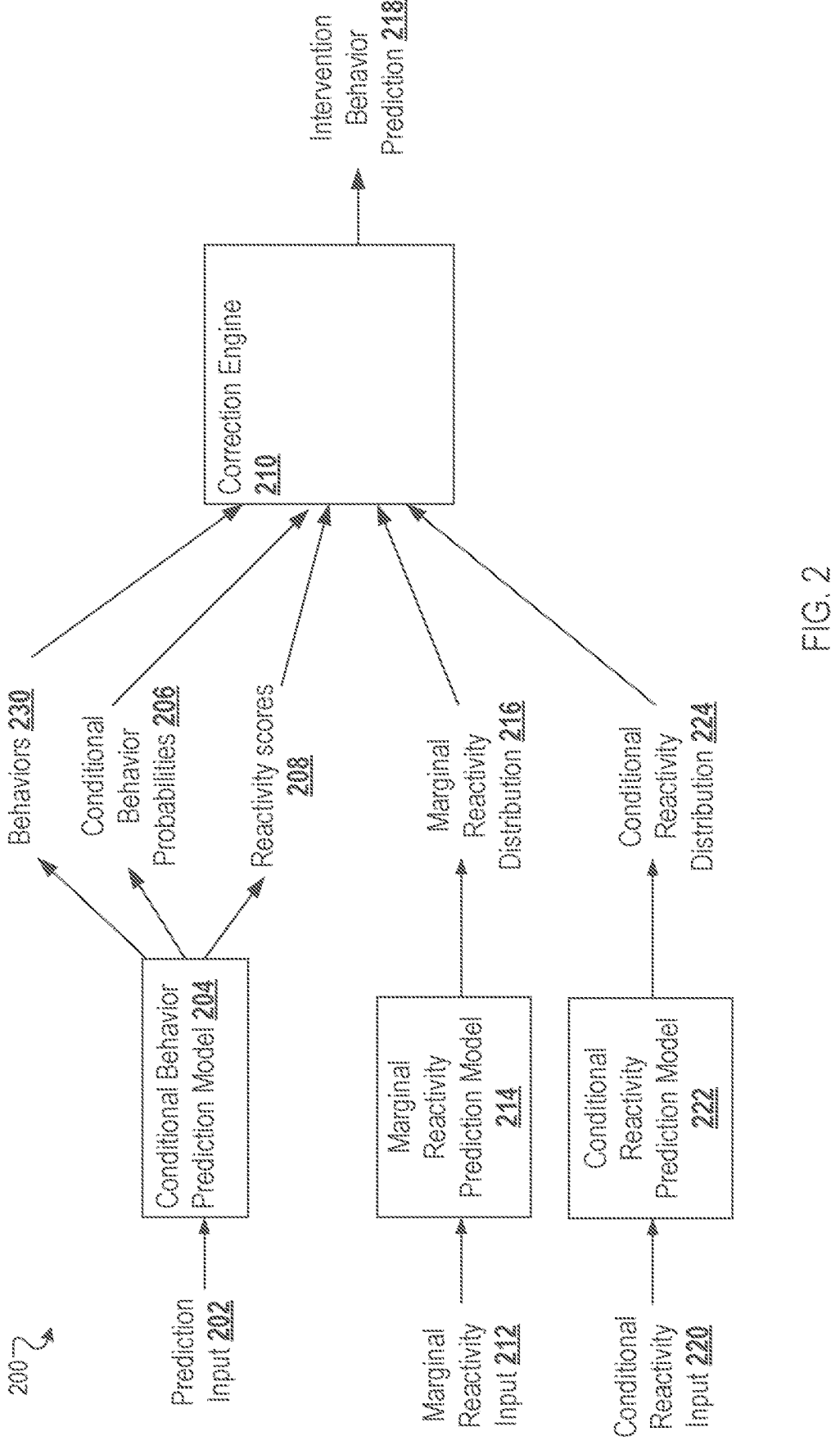
FIG. 2 illustrates an example of an intervention prediction model.

FIG. 2 shows an example intervention prediction model 200.

The description of FIG. 2 describes the confounder variable as being a reactivity variable. In general, however, the confounder variable can be any appropriate variable that impacts the response of the agent to the intervention, e.g., any of the confounder variables described above.

As shown in FIG. 2, the intervention prediction model 200 includes a conditional behavior prediction model 204, a marginal reactivity prediction model 214, a conditional reactivity prediction model 222, and a correction engine 210.

The conditional behavior prediction model 204 receives a prediction input 202 and generates conditional behavior probabilities 206 and reactivity scores 208 for each of a set of behaviors 230.

The marginal reactivity prediction model 214 receives a marginal reactivity input 212 and generates an output that defines a marginal reactivity distribution 216.

The conditional reactivity prediction model 222 receives a conditional reactivity input 220 and generates an output that defines a conditional reactivity distribution 224.

The correction engine 210 receives the corresponding conditional behavior probabilities 206 and reactivity scores 208 for the behaviors 230, the reactivity distribution 216, and the conditional reactivity distribution 224 and uses them to generate an intervention behavior prediction 218.

The prediction input 202, the marginal reactivity input 212, and the conditional reactivity input 220 can be generated from the data characterizing a scene that includes the agent and the vehicle.

For example, the inputs 202, 212, and 220 can include context information of the environment (e.g., information identifying lanes, traffic signs, crosswalks, and other roadway features that can be found in a road graph or map of the environment), navigation history information of the agent, information about other agents in the scene, and navigation history information of the vehicle. The inputs can include sensor data characterizing the scene that includes the agent and the vehicle in the environment. For example, the inputs can include an image or a video captured by a camera sensor, a point cloud captured by a lidar sensor, and a road graph or map of the environment.

For example, the prediction inputs 202, 212, and 220 can include navigation history information of the agent, the autonomous vehicle, and other vehicles in the environment. The navigation history can include a sequence of the position, velocity, orientation of the agent or the vehicle at a predetermined interval over a period of time, e.g., every 0.1 seconds in the last two seconds. The inputs can include context information of the environment, e.g., a set of roadway features within a threshold distance from the agent or the autonomous vehicle. Each roadway feature can be described by a type encoded in a 1-hot vector. In some implementations, the inputs can include a sequence of waypoint positions relative to the agent's or the autonomous vehicle's location sampled at a predetermined distance interval.

Additionally, the prediction input 202 and the conditional reactivity input 220 both include a future plan for the autonomous vehicle. The conditional behavior prediction model 204 and the conditional reactivity prediction model 222 receive the future plan, while the marginal reactivity prediction model 214 is referred to as a "marginal" prediction model because it does not take a future plan into account.

In some examples, each of the conditional behavior prediction model 204, the marginal reactivity prediction model 214, and the conditional reactivity prediction model 222 are separate neural networks. Each neural network can include a multilayer perceptron, a Recurrent Neural Network (RNN) such as a Long short-term memory (LSTM) neural network (Hochreiter, Sepp, and Jürgen Schmidhuber. "Long short-term memory." Neural computation 9.8 (1997): 1735-1780), a transformer neural network (Vaswani, Ashish, et al. "Attention is all you need." Advances in neural information processing systems 30 (2017)), etc. In some implementations, each neural network can have the same architecture. In other implementations, two or more of the neural networks can have different architectures.

In other examples, the conditional behavior prediction model 204, the marginal reactivity prediction model 214, and the conditional reactivity prediction model 222 are implemented as separate heads on top of a shared encoder, i.e., that receive an input that includes the output of the shared encoder. For example, the intervention behavior prediction model 200 can include a MultiPath++ model using multi-context gating (Varadarajan, Balakrishnan, et al. "MultiPath++: Efficient Information Fusion and Trajectory Aggregation for Behavior Prediction." arXiv preprint arXiv: 2111.14973 (2021)), or a convolutional neural network (Refaat, Khaled S., et al. "Agent prioritization for autonomous navigation." 2019 IEEE/RSJ International Conference on Intelligent Robots and Systems (IROS). IEEE, 2019).

The conditional behavior prediction model 204 can be any appropriate type of machine learning model, e.g., a neural network model, or another type of machine learning model. The conditional behavior prediction model 204 can be used to generate a plurality of predicted conditional behavior probabilities 206 and reactivity scores 208 that each correspond to a candidate behavior. There can be one or more candidate behaviors. The conditional behavior prediction model 204 can score predetermined "anchor" candidates or generate a gaussian mixture model type output over the space of possible future behaviors.

The candidate behaviors can be possible behaviors of an agent if the autonomous vehicle follows a certain future plan. The candidate behaviors can be possible trajectories that a nearby agent may follow in response to the autonomous vehicle following a certain path or performing a certain action.

The conditional behavior prediction model 204 processes an input 202 to generate an output that defines conditional behavior probabilities 206 along with reactivity scores 208 for all candidate behaviors 230. The conditional behavior prediction can be a set of all candidate behaviors 230 along with, for each behavior, a respective computed conditional probability 206 e.g., a value between 0 and 1, and a corresponding reactivity score 208 e.g., a value between −1 and 1, with −1 being unreactive and 1 being very reactive. For each behavior i, the conditional probability can be denoted as $P_i$ and the corresponding reactivity as $R_i$.

The conditional behavior prediction model 204 can compute a set of behaviors 230 along with the corresponding conditional behavior probabilities 206 and reactivity scores 208 for a given future plan for the autonomous vehicle in the prediction input 202. The conditional behavior prediction model 204 can generate a diverse set of behaviors 230, where the corresponding reactivity scores 208 represent different possible reactivity values.

The marginal reactivity prediction model 214 can be any appropriate type of machine learning model, e.g., a neural network model or another type of machine learning model. The marginal reactivity prediction model 214 processes a marginal reactivity input 212 and generates an output that defines a reactivity distribution 216 over a plurality of reactivity scores for the reactivity of the agent. By generating the intervention behavior prediction using the reactivity probability distribution rather than assigning a single reactivity score to a given agent, the system can take into consideration various possible reactivities for the given agent, improving the robustness of the prediction and making the IBP suitable for the safety critical nature of autonomous driving.

The marginal reactivity distribution 216 is a continuous probability distribution that describes reactivity as a continuous variable. The marginal reactivity prediction model 214 generates the parameters of the marginal reactivity distribution. For example, the marginal reactivity distribution 216 can be a Gaussian distribution and the model 214 can output a mean and variance. As another example, the marginal reactivity distribution 216 can be represented as a mixture of gaussians functions. The probability of an agent having reactivity $R_i$ can be denoted as $P(R_i)$ and can be determined from this reactivity distribution.

The conditional reactivity prediction model 222 can be any appropriate type of machine learning model, e.g., a neural network model or another type of machine learning model. The conditional reactivity prediction model 222 processes a reactivity prediction input 220 and generates a conditional reactivity distribution 224 over a plurality of reactivity scores for the reactivity of the agent given a future plan for the autonomous vehicle.

The conditional reactivity distribution 224 is a continuous probability distribution that describes conditional reactivity as a continuous variable. The conditional reactivity prediction model 214 generates the parameters of the conditional reactivity distribution. For example, the conditional reactivity distribution 216 can be a Gaussian distribution and the model 214 can output a mean and variance. In some examples, the marginal reactivity distribution 216 can be represented as a mixture of gaussians functions. The probability of an agent having reactivity $R_i$ given a particular future plan for the autonomous vehicle can be denoted as $P(R_i|ADV plan)$ and found from this reactivity distribution.

In practice, the system can receive multiple different possible future plans for the autonomous vehicle and generate respective intervention behavior probabilities for each plan. When given multiple plans, the system only generates a single marginal reactivity distribution 216, but separate conditional behavior probabilities 206 and reactivity scores 208 for the set of behaviors 230 for each plan and separate conditional reactivity distributions 224 for each plan. The conditional reactivity distributions for different plans can be generated in parallel, e.g., by batching the corresponding inputs to the corresponding neural networks. The conditional behavior probabilities 206 and reactivity scores 208 for the set of behaviors 230 for different plans can also be generated in parallel.

The correction engine 210 processes the corresponding conditional behavior probabilities 206 and reactivity scores 208 for the set of behaviors, the marginal reactivity distribution 216, and the conditional reactivity distribution 224 to generate a corrected prediction 218. In particular, for each behavior, the engine 210 generates a correction to the conditional probability for the behavior using the marginal reactivity distribution 216 and the conditional reactivity distribution 224. The correction removes a biased effect in the original conditional probability, i.e., modifies the original conditional probability to properly account for the potential presence of the reactivity confounder variable.

For example, for each behavior with $P_i$ and $R_i$ the correction engine 210 can compute the intervention probability for all given future plans for the vehicle as $P_i \times P(R_i) \times P(R_i|ADV plan)^{-1}$. The correction engine 210 computes the intervention probability using this formula in order to remove a biased effect and generate a more accurate prediction.

After the correction engine 210 computes the intervention probabilities for all behaviors and all future plans for the autonomous vehicle, the correction engine normalizes the intervention probabilities to sum to 1. The correction engine 210 then generates a corrected intervention behavior prediction 218.

The corrected intervention behavior prediction 218 can predict the behavior of nearby agent by predicting how the nearby agent would react if the autonomous vehicle follows a certain future plan. The corrected intervention behavior prediction 218 can include a probability distribution over the plurality of the candidate behaviors for the agent in reaction to the autonomous vehicle performing the future plan.

FIG. 3 is a flow chart of an example process 300 for intervention behavior prediction. The example process in FIG. 3 uses a forward inference pass through a marginal confounder prediction model, a conditional confounder prediction model, and a conditional behavior prediction model that have already been trained or are being trained to generate a prediction error for predicted probability distribution. The process will be described as being performed by an appropriately programmed machine learning system, such as the on-board system 120 or the training system 110 of FIG. 1.

The system receives data characterizing a scene that includes a first agent and a second agent in an environment (302). In some implementations, the second agent can be an autonomous vehicle and the first agent can be a road-user that is in the same environment as the autonomous vehicle. The system receives intervention data specifying a planned intervention to be performed by the second agent (304). For example, the system receives an intervention query from a planning subsystem when the planning subsystem is planning possible actions for the autonomous vehicle. The intervention query can be a request for information about how a nearby agent might react if the autonomous vehicle follows a certain action.

The system generates, using a conditional behavior prediction model, a conditional behavior prediction output that assigns to each of a plurality of future behaviors, (i) a respective conditional likelihood that the first agent performs the possible future behavior given that the second agent performs the planned intervention and (ii) a predicted value of a confounder variable for the possible future behavior (306).

In some implementations, the confounder variable can be a multi-dimensional variable that includes two or more characteristics, e.g., reactivity and intent, or awareness and driving style. The confounder prediction model can be configured to generate a joint distribution for the multi-dimensional variable. In some implementations, the variables of the multi-dimensional confounder variable can be independent. The system can separately compute a respective probability distribution of each variable. The system can compute the joint distribution by multiplying the independent probability distributions of the variables.

In some implementations, the system can compute the predicted value of a confounder variable for the possible future behavior algorithmically. The system can compute the confounder variable as a function of the possible future behavior of the agent and the planned intervention by the autonomous vehicle. One example of a such a technique for computing the confounder value for a possible future behavior algorithmically is described in Schwartig, Wilko, et al. "Social Behavior for Autonomous Vehicles." *Proceedings of the National Academy of Sciences* 116.50: 24972-24978 (2019).

The system generates an intervention behavior prediction for the first agent by, for each possible future behavior, generating a corrected likelihood for the possible future behavior based on the respective conditional likelihood for the possible future behavior and the predicted value of the confounder variable for the possible future behavior (308).

The intervention behavior prediction includes a probability distribution over the plurality of the possible behaviors for the first agent in reaction to the second agent performing the planned intervention. The system can generate the intervention behavior prediction as described above with reference to FIG. 2 and below with reference to FIG. 4.

In some implementations, the system can generate a planned trajectory for the second agent using the intervention behavior prediction for the first agent. For example, the system can generate a planned trajectory for an autonomous vehicle using the IBP for a nearby agent.

In some implementations, the system can obtain a plurality of planned interventions for the second agent. For each planned intervention of the plurality of planned interventions, the system can compute a respective intervention behavior prediction for the first agent in reaction to the second agent performing the planned intervention. The system can generate a planned trajectory for the second agent by comparing the intervention behavior predictions corresponding to the plurality of planned interventions.

For example, the system can obtain a first planned intervention by the second agent. The system can compute a first intervention behavior prediction for the first agent in reaction to the second agent performing the first planned intervention. The system can obtain a second planned intervention by the second agent. The system can compute a second intervention behavior prediction for the first agent in reaction to the second agent performing the second planned intervention. The system can generate a planned trajectory for the second agent by comparing the first intervention behavior prediction and the second intervention behavior prediction.

In some implementations, the system can generate the respective intervention behavior predictions corresponding to the plurality of planned intervention in parallel or in sequence. For example, a planning subsystem can predict N different possible plans that an autonomous vehicle might do in the current context. The system can generate N intervention behavior predictions for those N plans in parallel. The planning subsystem can use the N intervention behavior predictions to refine or update its plans. In some implementations, the planning subsystem can generate M updated plans, and can query the system with the M updated plans. The system can generate M intervention behavior predictions for the M updated plans.

For example, the system can generate a first IBP for an agent in reaction to a planned yielding action of an autonomous vehicle. The system can generate a second IBP for the agent in reaction to a planned passing action of the autonomous vehicle. The system can compare the agent's predicted behavior distributions in the first IBP and the second IBP. Based on that, the system can determine a planned action for the autonomous vehicle, e.g., yielding to the agent if that is safer for the agent.

In some implementations, there may exist multiple agents in the vicinity of an autonomous vehicle, and the multiple agents may each respond to an intervention of the autonomous vehicle. The system can predict the IBP for each agent in the environment, given the context information of the environment and the navigation history of the multiple agents. In some implementations, the system can include a separate IBP model for each agent. The system can implicitly generate a marginal behavior prediction over the interactions of one agent with other agents. The system can decompose the multiple agents IBP into multiple per agent IBP. The multiple per agent IBP can be computed independently and taking into account information of other agents in their respective inputs. For example, for multiple agents 1, . . . , N and an autonomous vehicle invention, the system can decompose Pr(Agent 1 behavior prediction, . . . , Agent N behavior prediction|Do (autonomous vehicle intervention)) as Pr(Agent 1 behavior prediction|Do (autonomous vehicle intervention)), . . . , Pr(Agent N behavior prediction|Do(autonomous vehicle intervention)).

In some implementations, if an agent's behavior is independent of another agent's behavior and is only impacted by the autonomous vehicle's behavior, the system can use the example process 300 to compute a separate intervention behavior prediction for each agent of the multiple agents. In some implementations, if one agent's behavior can be affected by another agent's behavior, the confounder variable can include an aggregation of future variables of the multiple agents and a variable state of the environment, e.g., future reactivities of each agent, future traffic light, future awareness of each agent, etc. The system can compute a confounder distribution for the confounder variable and can compute the intervention behavior prediction using the example process 300. For example, for multiple agents 1, . . . , N and an autonomous vehicle invention, the system can compute Pr(Agent 1 behavior prediction, . . . , Agent N behavior prediction|Do(autonomous vehicle intervention)) using the example process 300.

In some implementations, the marginal confounder prediction model, the conditional confounder prediction model, and the conditional behavior prediction model can share an encoder that generates an embedding from data characterizing a scene that includes the first agent and the second agent in the environment. In some implementations, there may exist multiple agents in the vicinity of an autonomous vehicle and the multiple agents may respond to an intervention of the autonomous vehicle. A global encoder can be configured to receive data characterizing a scene that includes the multiple agents and the autonomous vehicle in the environment and to generate a respective embedding each of the multiple agents. The respective embedding for each agent can be used to generate the marginal confounder distribution, the conditional confounder distribution, and the predicted conditional probability distributions for each agent, and to generate the IBP for each agent.

In some implementations, the system can generate the intervention behavior prediction incrementally to maintain the temporal causality between the vehicle's intervention and the agent's confounder score. Instead of providing the entire planned intervention to the conditional behavior prediction model up front, the system can provide the vehicle's planned intervention gradually in sequence as the agent's behavior is predicted, e.g., as a sequence of actions or trajectory segments revealed one at a time while making corresponding predictions of the agent's behavior or reaction given the revealed sequence of actions or trajectory segments so far.

For example, the planned intervention can be a lane change action. The system can provide a first action (e.g., slowing down or speeding up) of the planned intervention over a first period of time T0 to T1 to the conditional behavior prediction model, and the system can generate a first intervention prediction for the agent over the first period from T0 to T1. The system can provide a second action (e.g., moving towards the left lane) of the planned intervention over a second period of time T1 to T2 to the conditional behavior prediction model, and the system can generate a second intervention prediction for the agent over the second period from T1 to T2. In this way, the system can avoid the situation where the system makes an intervention behavior prediction at an earlier period of time based on the entire planned intervention.

FIG. 4 is a flow chart of an example process 400 for intervention behavior prediction. The example process in FIG. 4 uses a forward inference pass through a marginal confounder prediction model, a conditional confounder prediction model, and a conditional behavior prediction model that have already been trained or are being trained to generate a prediction error for predicted probability distribution. The process will be described as being performed by an appropriately programmed machine learning system, such as the on-board system 120 or the training system 110 of FIG. 1.

The system receives data characterizing a scene that includes a first agent and a second agent in an environment (402). In some implementations, the second agent can be an autonomous vehicle, the first agent can be a road-user that is in the same environment as the autonomous vehicle.

The system receives intervention data specifying a planned intervention to be performed by the second agent (404). The system receives an intervention query from a planning subsystem when the planning subsystem is planning a few possible actions for the autonomous vehicle. The intervention query can include a question asking what a nearby agent might react if the autonomous vehicle follows a certain action.

The system generates, using a conditional behavior prediction model, a conditional behavior prediction output that assigns to each of a plurality of future behaviors, (i) a respective conditional likelihood that the first agent performs the possible future behavior given that the second agent performs the planned intervention and (ii) a predicted value of a confounder variable for the possible future behavior (406). The conditional behavior prediction model processes the scene data and the intervention data and generates conditional behavior probabilities along with confounder values for each of the plurality of future behaviors.

The conditional behavior prediction model can be trained on labeled training data by a training system, e.g., the training system 110 of FIG. 1. The training data can include a plurality of training examples, and each training example can include an input characterizing a scene that includes the agent and the vehicle, a ground truth behavior label, and a ground truth confounder label.

The ground truth behavior label can be obtained from a driving log of the vehicle, indicating what the agent did in the future.

The ground truth confounder labels of the training data can be obtained with auto-labeling or human labeling.

The system can obtain information indicating a final goal or an intent of the agent, e.g., a predicted intent generated from a vehicle intent prediction model. The system can determine the agent's ground truth confounder labels, e.g., the confounder scores, by comparing the agent's intent and the agent's actual behavior in the future.

The training system can train the conditional behavior prediction model on labeled training data using supervised learning. The training system can train the conditional behavior prediction model based on a loss function that measures a difference between the predicted conditional probability distribution and the ground truth behavior label as well as the predicted confounder scores and the ground truth confounder labels. The loss function can include a classification loss, a regression loss, or both. The classification loss can measure the difference between the predicted probability distribution over the behavior confounder values and the ground truth behavior confounder values included in the ground truth behavior label. The regression loss can measure the difference between the predicted trajectories (e.g., locations at one or more future time steps) and a ground truth trajectory included in the ground truth behavior label.

The training system generates updated model parameter values for the conditional behavior prediction model by using an appropriate updating technique, e.g., stochastic gradient descent with backpropagation. The training system can then update the collection of model parameter values of the conditional behavior prediction model using the updated model parameter values.

Once trained, the conditional behavior prediction model can be used to generate a plurality of predicted conditional probability distributions, e.g., Pr(Agent Prediction|intervention).

The system processes a marginal confounder prediction input using a marginal confounder prediction model to generate a marginal confounder distribution (408). The marginal confounder prediction model is configured to receive the confounder prediction input and to process the confounder prediction input to generate a marginal confounder distribution over a plurality of possible values for the confounder variable.

The marginal confounder prediction model can be trained on labeled training data by a training system, e.g., the training system 110 of FIG. 1. The training data can include a plurality of training examples, and each training example can include a marginal confounder prediction input and a ground truth confounder label.

The ground truth confounder label is the agent's confounder value under the environment characterized by the marginal confounder prediction. The ground truth confounder label of the training data can be obtained with auto-labeling or human labeling. In some implementations, the training system can obtain information indicating what happened in the future between the agent and the vehicle, e.g., from a driving log of the vehicle, and determine the agent's actual behavior in the future, e.g., an actual trajectory of the agent. The system can obtain information indicating a final goal or an intent of the agent, e.g., a predicted intent generated from a vehicle intent prediction model. The system can determine the agent's ground truth confounder label by comparing the agent's intent and the agent's actual behavior in the future.

For example, the system can use a distance metric to measure a distance between a planned trajectory of the agent and an actual trajectory of the agent, and the distance can indicate a confounder label for the agent to the vehicle and can be used to determine the ground truth confounder label. For example, when the confounder variable is reactivity, if the distance is large, the system can determine that the ground truth confounder label is a high number on a predetermined scale. If the distance is small, the system can determine that the ground truth reactivity label is a low number on the same predetermined scale. As another example, the training system can determine a reactivity label as a function of the distance between the actual behavior of the agent and the intent of the agent over a period of time.

In some implementations, the auto-labeling can be replaced or complemented by human labeling. A human labeler can subjectively measure the confounder value of the agent and determine the ground truth confounder label.

The training system can train the marginal confounder prediction mode on labeled training data using supervised learning. The training system can train the marginal confounder prediction model based on a loss function that measures a difference between the predicted confounder distribution and the ground truth confounder labels. The loss function can be a classification loss, such as a cross entropy loss. The training system generates updated model parameter values for the marginal confounder prediction model by using an appropriate updating technique, e.g., stochastic gradient descent with backpropagation. The training system can then update the collection of model parameter values of the marginal confounder prediction model using the updated model parameter values.

Once trained, the marginal confounder prediction model can be used to generate a prediction of the agent's marginal confounder distribution to the vehicle, e.g., Pr(Confounder), over multiple time steps of a period of time. At each time step, the model can generate a prediction for the agent's confounder value at the current time step. For example, suppose the system receives a query requesting the IBP at time T=1, the system can use the marginal confounder prediction model to generate a predicted marginal confounder distribution Pr(Confounder) at T=1. Because the agent's confounder value can change over time, the model can accurately generate updated predictions of the agent's confounder value over time.

The system processes a conditional confounder prediction input using a conditional confounder prediction model to generate a conditional confounder distribution (410). The conditional confounder prediction model is configured to receive the confounder prediction input and to process the confounder prediction input to generate a conditional confounder distribution over a plurality of possible values for the confounder variable conditioned on possible behaviors of the first agent. The conditional confounder prediction model is also configured to receive one or more future plans for the autonomous vehicle.

The conditional confounder prediction model can be trained on labeled training data by a training system, e.g., the training system 110 of FIG. 1. The training data can include a plurality of training examples, and each training example can include a conditional confounder prediction input and a ground truth confounder label.

In some implementations, the auto-labeling can be replaced or complemented by human labeling. A human labeler can subjectively measure the confounder value of the agent and determine the ground truth confounder label.

The training system can train the conditional confounder prediction model on labeled training data using supervised learning. The training system can train the conditional confounder prediction model based on a loss function that measures a difference between the predicted conditional confounder distribution and the ground truth confounder label. The loss function can be a classification loss, such as a cross entropy loss. The training system generates updated model parameter values for the conditional confounder prediction model by using an appropriate updating technique, e.g., stochastic gradient descent with backpropagation. The training system can then update the collection of model parameter values of the conditional confounder prediction model using the updated model parameter values.

Once trained, the conditional confounder prediction model can be used to generate a prediction of the agent's conditional confounder distribution to the vehicle, e.g., Pr(Confounder|Possible Behavior), over multiple time steps of a period of time. At each time step, the model can generate a prediction for the agent's confounder value at the current time step. For example, suppose the system receives a query requesting the IBP at time T=1, the system can use the conditional confounder prediction model to generate a predicted conditional confounder distribution Pr(Confounder|Possible Behavior) at T=1. Because the agent's confounder value can change over time, the model can accurately generate updated predictions of the agent's confounder value over time.

The system generates an intervention behavior prediction for the first agent by, for each possible future behavior, generating a corrected likelihood for the possible future behavior (412). The corrected likelihood is based on the respective conditional likelihood for the possible future behavior and the predicted value of the confounder variable for the possible future behavior. The intervention behavior prediction includes a probability distribution over the plurality of the possible behaviors for the first agent in reaction to the second agent performing the planned intervention.

The correction removes a biased effect in the original conditional probability, i.e., modifies the original conditional probability to properly account for the potential presence of the confounder variable. For example, where $P_i$ represents a conditional probability and $R_i$ represents a confounder value, for each behavior with $P_i$ and $R_i$, the system can compute the intervention probability for all given future plans for the vehicle as $P_i \times P(R_i) \times P(R_i|ADV plan)^{-1}$. The system computes the intervention probability using this formula in order to remove a biased effect and generate a more accurate prediction.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

receiving scene data characterizing a scene that includes a first agent and an autonomous vehicle in an environment;

receiving intervention data specifying a planned intervention to be performed by the autonomous vehicle;

generating, using a conditional behavior prediction model, a conditional behavior prediction output that assigns, to each of a plurality of possible future behaviors, (i) a respective conditional likelihood that the first agent performs the possible future behavior given that the autonomous vehicle performs the planned intervention and (ii) a predicted value of a confounder variable for the possible future behavior;

generating an intervention behavior prediction for the first agent by, for each possible future behavior, generating a corrected likelihood for the possible future behavior based on the respective conditional likelihood for the possible future behavior and the predicted value of the confounder variable for the possible future behavior;

selecting a planned trajectory for the autonomous vehicle based on the intervention behavior prediction; and causing the autonomous vehicle to operate based on the planned trajectory.

2. The method of claim 1, further comprising:

determining a predicted conditional probability that is conditioned on the planned intervention for each of the predicted values of the confounder variable; and wherein generating the corrected likelihood for the possible future behavior comprises generating the corrected likelihood for the possible future behavior based on the respective conditional likelihood for the possible future behavior, the predicted value of the confounder variable for the possible future behavior, and the predicted conditional probability for each of the predicted values for the confounder variable.

3. The method of claim 2, wherein determining a predicted probability for each of the predicted values of the confounder variable comprises:

processing a confounder prediction input generated from the scene data and the intervention data using a confounder prediction model, wherein the confounder prediction model is configured to receive the confounder prediction input and to process the confounder prediction input to generate a confounder distribution over a plurality of possible values for the confounder variable, wherein the confounder distribution comprises a predicted probability value for each of the possible values of the confounder variable.

4. The method of claim 3, further comprising:

processing the scene data using an encoder neural network to generate an encoded representation of the scene data, wherein an input to the conditional behavior prediction model and the confounder prediction input are a same input that comprises the encoded representation and the intervention data.

5. The method of claim 2, further comprising:

determining a predicted marginal probability for each of the predicted values of the confounder variable; and wherein generating the corrected likelihood for the possible future behavior comprises generating the corrected likelihood for the possible future behavior based on the respective conditional likelihood for the possible future behavior, the predicted value of the confounder variable for the possible future behavior, the predicted conditional probability for the predicted value for the confounder variable, and the predicted marginal probability for the predicted value for the confounder variable.

6. The method of claim 1, wherein the confounder variable comprises a reactivity of the first agent to the planned intervention.

7. The method of claim 1, wherein the first agent is a road-user that is in a same environment as the autonomous vehicle.

8. The method of claim 1, further comprising:

obtaining a plurality of additional planned interventions by the autonomous vehicle;

for each additional planned intervention of the plurality of planned interventions, computing a respective additional intervention behavior prediction for the first agent in reaction to the autonomous vehicle performing the planned intervention; and wherein selecting a planned trajectory for the autonomous vehicle based on the intervention behavior prediction comprises selecting the planned trajectory for the autonomous vehicle based on the intervention behavior prediction and the additional intervention behavior predictions corresponding to the plurality of planned interventions.

9. A system comprising one or more computers and one or more storage devices storing instructions that when executed by the one or more computers cause the one or computers to perform operations comprising:

receiving scene data characterizing a scene that includes a first agent and an autonomous vehicle in an environment;

receiving intervention data specifying a planned intervention to be performed by the autonomous vehicle;

generating, using a conditional behavior prediction model, a conditional behavior prediction output that assigns, to each of a plurality of possible future behaviors, (I) a respective conditional likelihood that the first agent performs the possible future behavior given that the autonomous vehicle performs the planned intervention and (ii) a predicted value of a confounder variable for the possible future behavior;

generating an intervention behavior prediction for the first agent by, for each possible future behavior, generating a corrected likelihood for the possible future behavior based on the respective conditional likelihood for the possible future behavior and the predicted value of the confounder variable for the possible future behavior;

selecting a planned trajectory for the autonomous vehicle based on the intervention behavior prediction; and causing the autonomous vehicle to operate based on the planned trajectory.

10. The system of claim 9, wherein the operations further comprise:

determining a predicted conditional probability that is conditioned on the planned intervention for each of the predicted values of the confounder variable; and wherein generating the corrected likelihood for the possible future behavior comprises generating the corrected likelihood for the possible future behavior based on the respective conditional likelihood for the possible future behavior, the predicted value of the confounder variable for the possible future behavior, and the predicted conditional probability for each of the predicted values for the confounder variable.

11. The system of claim 10, wherein determining a predicted probability for each of the predicted values of the confounder variable comprises:

processing a confounder prediction input generated from the scene data and the intervention data using a confounder prediction model, wherein the confounder prediction model is configured to receive the confounder prediction input and to process the confounder prediction input to generate a confounder distribution over a plurality of possible values for the confounder variable, wherein the confounder distribution comprises a predicted probability value for each of the possible values of the confounder variable.

12. The system of claim 11, wherein the operations further comprise:

processing the scene data using an encoder neural network to generate an encoded representation of the scene data, wherein an input to the conditional behavior prediction model and the confounder prediction input are a same input that comprises the encoded representation and the intervention data.

13. The system of claim 10, wherein the operations further comprise:

determining a predicted marginal probability for each of the predicted values of the confounder variable; and wherein generating the corrected likelihood for the possible future behavior comprises generating the corrected likelihood for the possible future behavior based on the respective conditional likelihood for the possible future behavior, the predicted value of the confounder variable for the possible future behavior, the predicted conditional probability for the predicted value for the confounder variable, and the predicted marginal probability for the predicted value for the confounder variable.

14. The system of claim 9, wherein the confounder variable comprises a reactivity of the first agent to the planned intervention.

15. The system of claim 9, wherein the first agent is a road-user that is in a same environment as the autonomous vehicle.

16. The system of claim 9, wherein the operations further comprise:

obtaining a plurality of additional planned interventions by the autonomous vehicle;

for each additional planned intervention of the plurality of planned interventions, computing a respective additional intervention behavior prediction for the first agent in reaction to the autonomous vehicle performing the planned intervention; and wherein selecting a planned trajectory for the autonomous vehicle based on the intervention behavior prediction comprises selecting the planned trajectory for the autonomous vehicle based on the intervention behavior prediction and the additional intervention behavior predictions corresponding to the plurality of planned interventions.

17. One or more non-transitory computer storage media storing instructions that when executed by one or more computers cause the one or more computers to perform operations comprising:

receiving scene data characterizing a scene that includes a first agent and an autonomous vehicle in an environment;

receiving intervention data specifying a planned intervention to be performed by the autonomous vehicle;

generating, using a conditional behavior prediction model, a conditional behavior prediction output that assigns, to each of a plurality of possible future behaviors, (i) a respective conditional likelihood that the first agent performs the possible future behavior given that the autonomous vehicle performs the planned intervention and (ii) a predicted value of a confounder variable for the possible future behavior;

generating an intervention behavior prediction for the first agent by, for each possible future behavior, generating a corrected likelihood for the possible future behavior based on the respective conditional likelihood for the possible future behavior and the predicted value of the confounder variable for the possible future behavior;

selecting a planned trajectory for the autonomous vehicle based on the intervention behavior prediction; and causing the autonomous vehicle to operate based on the planned trajectory.

18. The non-transitory computer storage media of claim 17, wherein the operations further comprise:

determining a predicted conditional probability that is conditioned on the planned intervention for each of the predicted values of the confounder variable; and wherein generating the corrected likelihood for the possible future behavior comprises generating the corrected likelihood for the possible future behavior based on the respective conditional likelihood for the possible future behavior, the predicted value of the confounder variable for the possible future behavior, and the predicted conditional probability for each of the predicted values for the confounder variable.

19. The non-transitory computer storage media of claim 18, wherein determining a predicted probability for each of the predicted values of the confounder variable comprises:

processing a confounder prediction input generated from the scene data and the intervention data using a confounder prediction model, wherein the confounder prediction model is configured to receive the confounder prediction input and to process the confounder prediction input to generate a confounder distribution over a plurality of possible values for the confounder variable, wherein the confounder distribution comprises a predicted probability value for each of the possible values of the confounder variable.

20. The non-transitory computer storage media of claim 19, further comprising:

processing the scene data using an encoder neural network to generate an encoded representation of the scene data, wherein an input to the conditional behavior prediction model and the confounder prediction input are a same input that comprises the encoded representation and the intervention data.

* * * * *